Jan. 25, 1938.    J. C. McCUNE    2,106,489
MAGNETIC TRACK BRAKE
Filed Dec. 20, 1935
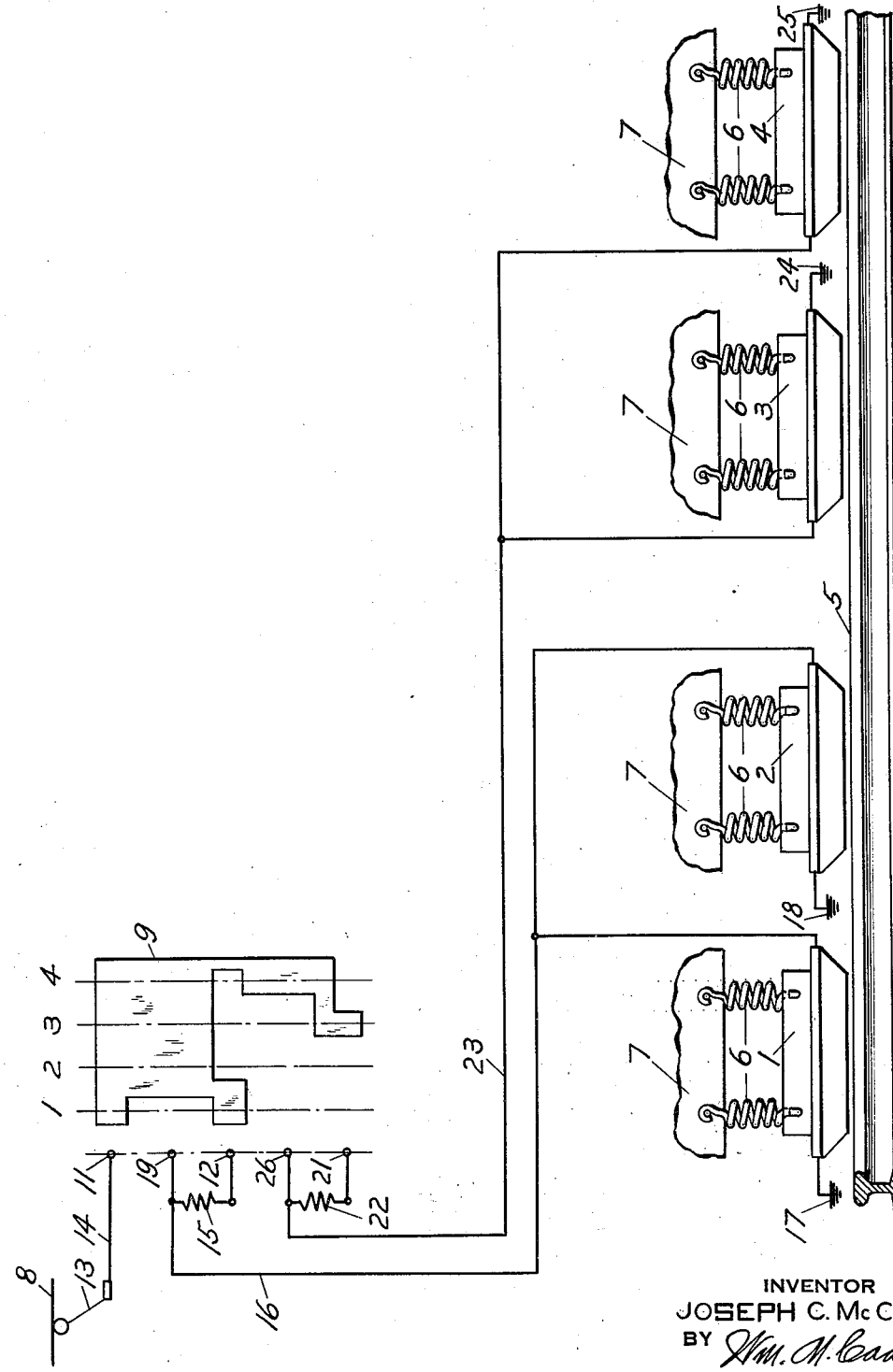
INVENTOR
JOSEPH C. McCUNE
BY Wm. M. Cady
ATTORNEY Patented Jan. 25, 1938

2,106,489

UNITED STATES PATENT OFFICE 2,106,489

MAGNETIC TRACK BRAKE

Joseph C. McCune, Edgewood, Pa., assignor to The Westinghouse Air Brake Company, Wilmerding, Pa., a corporation of Pennsylvania Application December 20, 1935, Serial No. 55,453

6 Claims. (Cl. 188—165)

This invention relates to magnetic brakes for railway trains or vehicles of the type having magnetic brake shoes adapted to engage the rails and to retard the vehicle by the dragging of the brake shoe on the rail due to the magnetic pull between the brake shoe and the rail.

Magnetic track shoe brakes are frequently used on railway vehicles as an auxiliary brake to supplement the braking force effected by fluid pressure brakes. Magnetic track shoes have heretofore been lowered into contact with the rail by electrical or pneumatic means before the exciting current is applied to energize the track shoes, in order to avoid the heavy shock to the car which would result as the track shoes engage the rail if they were energized sufficiently to be pulled down to the rail by their own magnetism. There are some objections to the use of such means for lowering the track shoes from the track rail because of the requirement of a considerable amount of equipment, such as pneumatic cylinders, magnet valve devices for controlling their operation and the necessary piping, etc. Where pneumatic means are employed, there are times when it is desired to move the car a limited distance when no fluid under pressure exists in the air brake system, and therefore no pressure exists in the pneumatic cylinders for holding the track shoes from engagement with the rails, thus making it necessary to drag the track shoes on the rail.

One object of my invention is the provision of a magnetic brake of the above indicated type wherein the magnet track shoes are spring supported and pulled into engagement with the rail by their own magnetic forces in such manner as to eliminate objectionable shock to the car due to the sudden increase in braking forces that may obtain at the time the track shoes contact the rail.

Another object of my invention is the provision of a plurality of brake shoes on a car or vehicle that are so controlled that only part of the brake shoes, such as those on one car truck, are permitted to be initially engaged at the same time.

A further object of my invention is the provision of means whereby the track shoes are energized with a low energization only to effect engagement thereof with the track rail, after which the energization of the track shoes may be increased to effect a full braking force.

Other objects and advantages of my invention will be apparent from the following description of one preferred embodiment thereof, reference being had to the accompanying drawing.

Referring to the drawing, the single figure is a diagrammatic view illustrating one preferred embodiment of the invention. Magnetic track shoes 1, 2, 3 and 4 are provided for engagement with the track rail 5, each brake shoe being suspended above the rails by coil springs 6, the lower ends of which are connected to the track shoes and the upper ends of which are connected to a portion 7 of the truck.

A controller having a conducting segment 9 is provided for controlling the energization of the track shoe magnets from a source of energy such as the overhead line conductor 8, and when moved to the first brake applying position indicated by the vertical dot and dash line on the segment 9, identified by the numeral 1, a circuit is completed from the line conductor 8 through the trolley 13, conductor 14, contact member 11, conducting segment 9, contact member 12, resistor 15, conductor 16, the windings of the track shoes 1 and 2, to ground at 17 and 18, respectively. The inclusion of the resistor 15 in the above traced circuit causes the winding of the magnet track shoes 1 and 2 to be energized to a low value only, but sufficiently to bring them into engagement with the track rail to provide a predetermined amount of braking force. Upon movement of the controller to the second control position, the contact member 19 engages and contact member 12 disengages the conducting segment 9 thus cutting the resistor 15 out of the above traced circuit to effect full energization of the track shoes 1 and 2.

Upon movement of the brake control conductor to its third braking position, indicated by the vertical dot and dash line 3 on the segment 9, the energization of the magnet track shoes 1 and 2 are maintained at their maximum value through the above traced circuit and the contact member 21 is brought into engagement with the conducting segment 9, thus completing a circuit from the overhead wire 8 through trolley 13, conductor 14, contact member 11, segment 9, contact member 21, resistor 22, conductor 23, the windings of the magnet track shoes 3 and 4 to ground at 24 and 25, respectively, thus effecting an initial low energization of the windings of the track shoes 3 and 4 by virtue of the inclusion of the resistor 22 in the above traced circuit. Upon movement of the controller to its fourth or full brake applying position the contact member 26 engages and contact member 21 disengages the conducting segment 9 thus cutting the resistor 22 out of the circuit through the windings of the track brakes 3 and 4 to effect full energization of the track shoes 3 and 4.

The brake shoes 1 and 2 may be associated with one vehicle truck, and the brake shoes 3 and 4 associated with the other vehicle truck. It will be seen, therefore that the application of the brakes is effected in a sequence of four steps. On the first step, energization of the track shoes associated with one vehicle truck is effected to a certain minimum degree sufficient to bring the track shoes into engagement with the track rail. On the second step, the energization of these brake shoes is increased to a maximum degree. On the third step, a certain minimum energization of the track shoes associated with another car truck is effected while maximum energization of the track shoes on the first-mentioned truck is maintained. On the fourth step, maximum energization of all the track shoes is effected. It will be obvious that the initial energization of the four illustrated track shoes may take place individually in four steps instead of in pairs of two steps each and that after the initial energization of a track shoe sufficient to bring it into engagement with the track rail the increase in energization from its minimum value to a maximum value may take place in any desired number of steps.

While one preferred embodiment of my invention has been illustrated and described it will be apparent to those skilled in the art that many modifications and changes in the apparatus and circuits illustrated may be made within the spirit of my invention and I do not wish to be limited otherwise than by the scope of the appended claims.

Having now described my invention, what I claim as new and desire to secure by Letters Patent, is:

1. In a brake equipment for vehicles, the combination with a plurality of spring suspended magnetic brake shoes, of control means for effecting the energization of said several shoes, said control means being arranged to effect energization of only certain of said track shoes to a certain degree to bring said shoes into engagement with the track rail and to thereafter increase the degree of energization thereof, to thereafter effect energization of other of said track shoes to a certain degree to bring them into engagement with the track rail and to thereafter increase the degree of energization thereof.

2. In a brake equipment for vehicles, the combination with a plurality of magnetic track shoes normally held suspended above the track rail, of means for effecting the initial energization of said several track shoes an amount sufficient to cause the track shoes to be moved into engagement with the track rail by magnetic attraction, and for thereafter increasing the energization thereof to increase their braking force, said means being effective to cause the initial energization of certain of said track shoes at different times from the initial energization of certain other of said track shoes.

3. In a brake equipment for vehicles, the combination with a plurality of magnet track shoes normally held suspended above the track rail, of a source of power, circuits for connecting said track shoe to said source of power, resistors adapted to be inserted in said circuits, and controller means for said brakes arranged to initially close the circuits to certain of said magnet track shoes with the associated resistor in circuit therewith, to thereafter close circuits to other of said magnet track shoes with the associated resistors in circuit therewith, and to shunt said resistors from said circuits after engagement of the track shoes with the track rail.

4. In a brake equipment for vehicles, the combination with a plurality of magnet track shoes, of helical springs for normally holding said shoes suspended above the track rail, a source of power, a current limiting resistor associated with each magnet track shoe, and means for connecting said track shoes to said source of power comprising a controller effective to connect certain of said track shoes to said source in circuit with their associated resistors, to shunt said resistors from said circuit, to connect other magnet track shoes to said source of power in circuit with their associated resistors, and to shunt said resistors from said circuit in the order named.

5. In a brake equipment for vehicles, the combination with a plurality of spring suspended magnetic track shoes, of a controller device operable as it is actuated into an application zone to initially energize a limited number of said track shoes, to then increase the energization of said limited number of track shoes, and to thereafter energize other of said plurality of track shoes and then increase their energization.

6. In a brake equipment for vehicles, the combination with a plurality of electromagnetic track brake shoes of control means, for controlling the energization and deenergization of the track brake shoes, having a plurality of different positions, said control means being effective in one position to cause energization of certain of said track brake shoes to a certain degree, effective in a second position to cause an increase in the energization of said certain track brake shoes to a greater degree, effective in a third position to cause energization of other of said track brake shoes to a second certain degree while maintaining said certain track brake shoes energized at said greater degree, and effective in a fourth position to cause an increase in the energization of the said other track brake shoes to a greater degree while maintaining the energization of the said certain track brake shoes at the said greater degree therefor.

JOSEPH C. McCUNE.